Sept. 15, 1925. Re. 16,166
D. M. KENNEDY
SIGNAL SYSTEM
Original Filed May 11, 1916 3 Sheets-Sheet 1
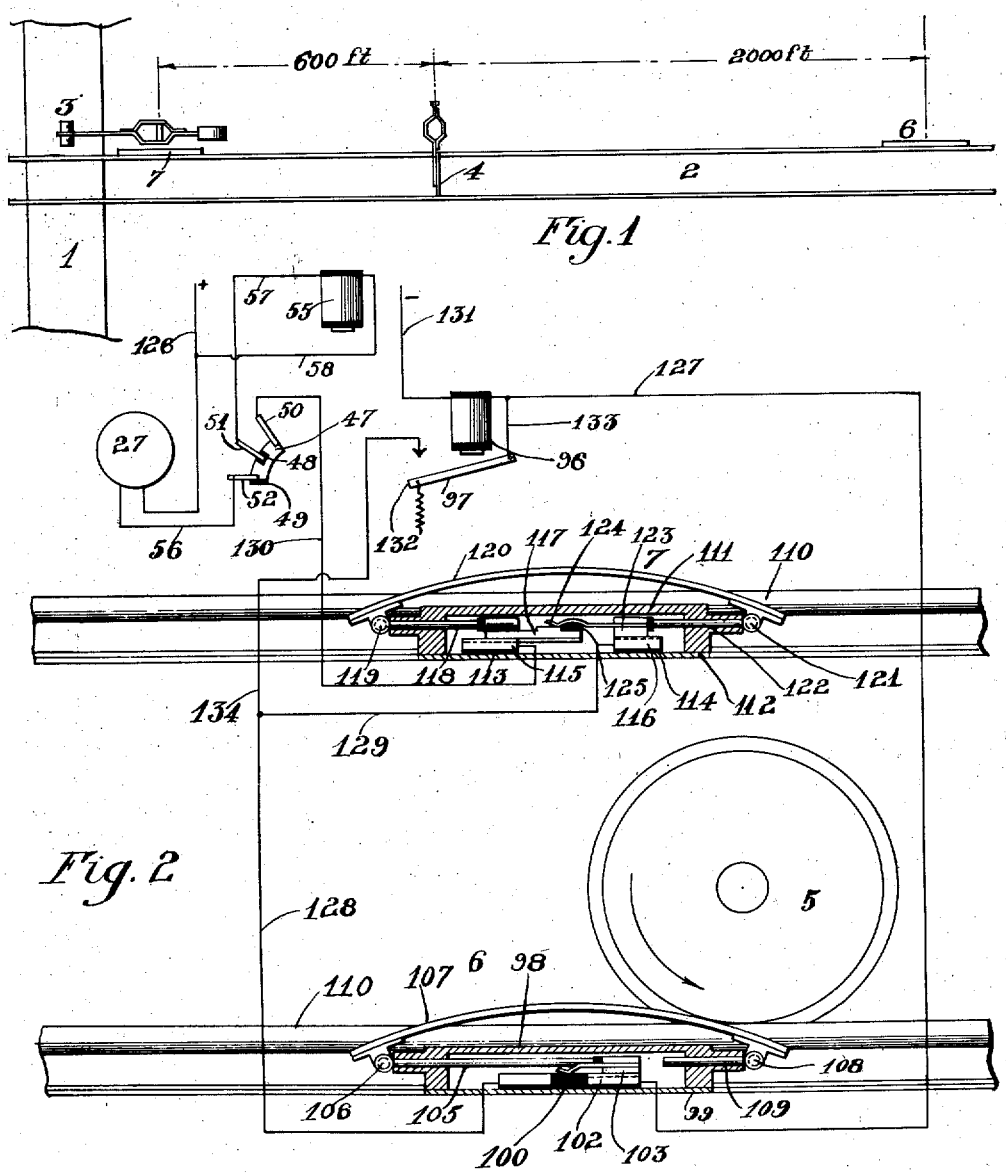
INVENTOR.
Dewey M. Kennedy
BY
Frederick S. C. Smith
HIS ATTORNEY.

Sept. 15, 1925. Re. 16,166

D. M. KENNEDY

SIGNAL SYSTEM

Original Filed May 11, 1916 3 Sheets-Sheet 2

INVENTOR.
Dewey M. Kennedy.
BY
Frederick S. Church
HIS ATTORNEY.

Sept. 15, 1925. Re. 16,166

D. M. KENNEDY

SIGNAL SYSTEM

Original Filed May 11, 1916 3 Sheets-Sheet 3

INVENTOR.
Dewey M. Kennedy.
BY
Frederick S. Lamb
HIS ATTORNEY.

Reissued Sept. 15, 1925.

Re. 16,166

UNITED STATES PATENT OFFICE.

DEWEY M. KENNEDY, OF SENECA FALLS, NEW YORK.

SIGNAL SYSTEM.

Original No. 1,349,001, dated August 10, 1920, Serial No. 96,902, filed May 11, 1916. Application for reissue filed January 17, 1921. Serial No. 438,005.

*To all whom it may concern:*

Be it known that I, DEWEY M. KENNEDY, a citizen of the United States, and a resident of Seneca Falls, in the county of Seneca and State of New York, have invented certain new and useful Improvements in Signal Systems; and I do hereby declare the following to be a full, clear, and exact description of the same, reference being had to the accompanying drawings, forming a part of this specification, and to the reference characters marked thereon.

My invention relates to signal systems and particularly to electrically controlled railroad crossing signals adapted to be operated by moving trains crossing or approaching a highway. One of the objects of the invention is to provide a highway signal at a railway crossing normally in clear position and adapted to be operated by an approaching train to cause the operation of a train signal indicating to the engineer that the highway signal at the crossing has been operated to signal the approach of the train. A further object of the invention is to provide a highway signal at a railroad crossing normally in clear position and adapted to be operated to danger position by an approaching train, said signal being connected with a second signal for signaling the train, the second signal being adapted to operate only after the highway signal has been operated. A still further object of the invention is to provide a highway crossing signal adapted to be operated from clear to danger position by an approaching train and back to clear position when the train passes said crossing. To these and other ends the invention consists in certain improvements and combinations of parts all as will be hereinafter more fully described, the novel features being pointed out in the claims at the end of the specification.

In the drawings:

Figure 1 is a diagrammatic plan view of a highway crossing showing the relative positions of the highway and train signals;

Fig. 2 is a view illustrating in section the circuit closing and breaking mechanism diagrammatically arranged and connected for operation by a train passing over the mechanism at the crossing;

Similar reference characters throughout the several views indicate the same parts.

In carrying out my present invention I provide a system of electrically controlled train and highway crossing signals, the latter being adapted to be operated upon the closing of an electric circuit by some portion of a moving train approaching the crossing, and the former by the operation of the highway signal.

I provide a highway signal embodying an arm or paddle normally held at clear by gravity and also fitted with clear and danger lights, together with a train signal a suitable distance down the track from the crossing and normally held by gravity at danger. There is a normally open electrical switch down the track that is first instantaneously closed by the train to set up a more lasting circuit through an actuating motor for the highway signal. As this signal moves to danger position, it closes a circuit through its own danger light. In circuit with this light is a device controlling the circuit of an operating mechanism for moving the train signal to clear, the idea being that by putting the highway light and signal in circuit with the train signal control, any failure of the highway signal to operate for any reason will extend to the train signal and cause the train to proceed only with caution against its signal. In the neighborhood of the crossing is a second train actuated and normally closed switch in the circuit established in the first instance by the normally open track switch. When the train reaches this second switch and opens it, the highway signal and all other circuits are broken and all parts returned to normal. In connection with the operating motor for the highway signal is necessarily employed a means whereby the motor is cut out of the circuit automatically when it has moved the signal to a sufficient extent.

Figures 5, 6, 7, 8, 9, 10, 11:
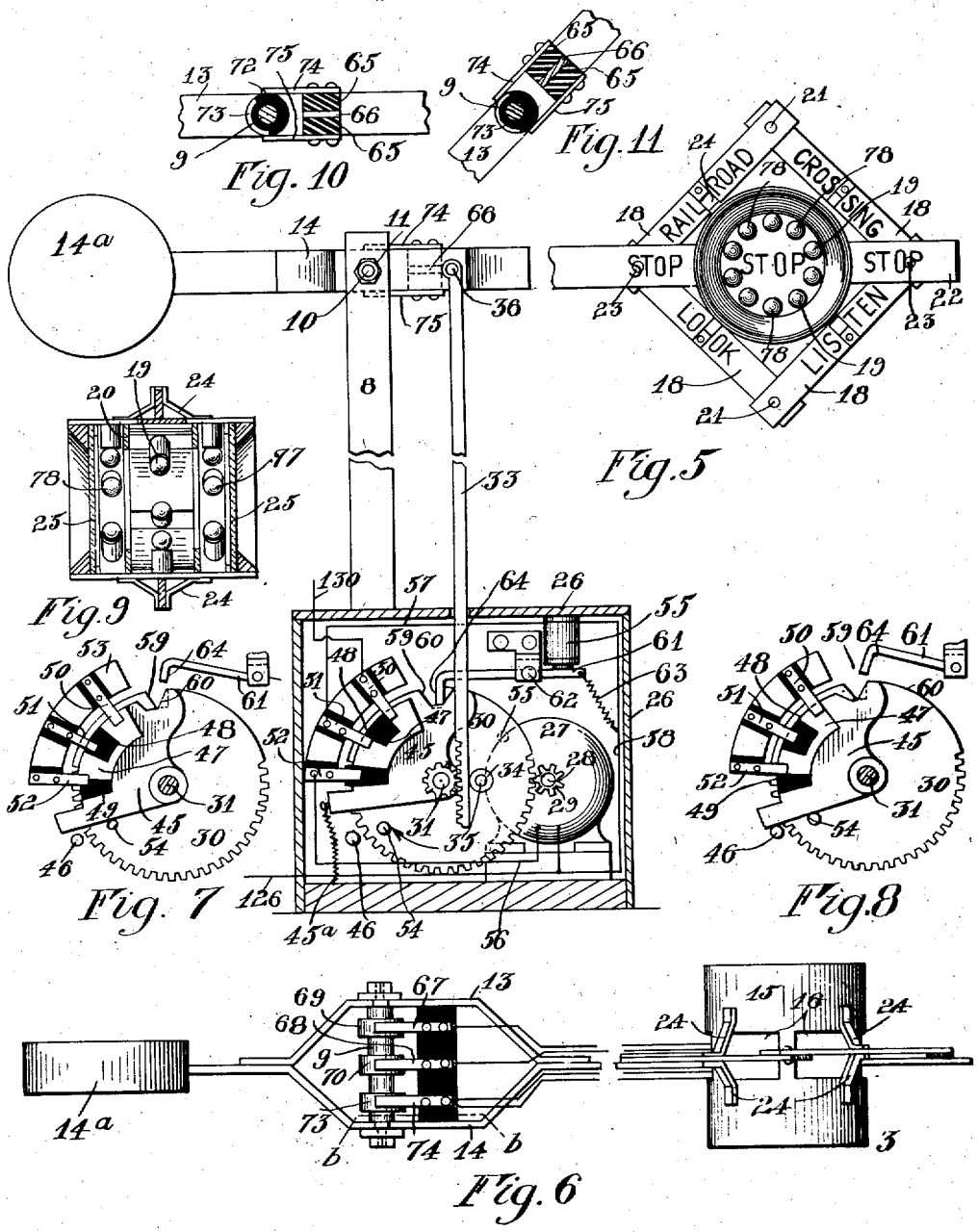
Fig. 5 is a sectional elevation taken on line *a—a* of Fig. 3 showing the highway signal in danger position and its operating mechanism in locked position.
Fig. 6 is a detail plan view of the highway signal and circuit controlling mechanism for the same.
Fig. 7 is a detail view showing a portion of the highway signal operating mechanism in its initial locking position.
Fig. 8 is a similar view showing the mechanism in unlocked position, but closely approaching its locked position.
Fig. 9 is a longitudinal sectional view through the lamp box taken on line *c—c* of Fig. 5.
Fig. 10 is a detail sectional view taken on line *b—b* of Fig. 6 with the highway signal moved to danger position.
Fig. 11 is a similar sectional view taken with the signal moved to clear position.

In the present instance the circuit controlling the highway signal is adapted to be closed by means of one of the wheels of the train passing over a circuit closing mechanism. However, if desired, this mechanism can be readily operated by any suitable projection carried by the train and arranged to contact with said mechanism. Referring to the drawings by numerals, 1 represents a road or highway which is shown as crossing a railway track 2. A highway signal 3 is shown at the crossing and a train signal 4 is positioned a suitable distance from the crossing as indicated in Fig. 1. The train signal 4 normally remains at danger position and is thrown to clear position when a wheel 5 of an approaching train depresses a circuit closing member 6, provided the circuit controlling the highway signal 3 and the mechanism for operating the signal are in working condition. If, however, said mechanism becomes inoperative for any reason the train signal 4 will remain in danger position thereby indicating to the engineer that he is to proceed cautiously or stop the train according to whatever rules he may be working under. If the engineer receives a clear signal and proceeds across the highway the train will operate a circuit breaking member 7 and the signals 3 and 4 will be returned to normal position in a manner which will presently be described. The highway signal 3 is shown at danger position in Fig. 5 and the train signal at clear position in Fig. 3. The highway signal is pivotally mounted upon spaced upright members 8 connected at their upper ends by a shaft or bolt 9 having reduced ends 10 extending through the upright members and rigidly secured thereon by the nuts 11. The shaft is preferably provided with reduced bearing portions adapted to pivotally receive the spaced signal supporting frame bars 13 and 14 brought together and connected upon opposite sides of the shaft as indicated in Fig. 6. The bar 13 is preferably terminated at its points of connection with the bar 14, while the latter is extended to receive a counterbalancing weight 14ª at one end and the signal 3 at the other end. The signal comprises a cylindrical lamp box 15 having centrally positioned spaced openings 16 arranged to be covered interiorly of the box by a transparent ring 17 preferably formed of glass adapted to permit the illumination of the sign boards or plates 18 by the lamps 19 which in the present instance, are the white lights which are arranged to be lighted when the signal is in a clear position. Reflecting rings 20 are positioned upon opposite sides of the lamps 19 as shown in Fig. 9 for throwing the light upon the sign boards to illuminate the same. Any suitable words of warning may be placed upon the sign boards as indicated in Fig. 5. The sign boards 18 are connected above and below the lamp box by pins or bolts 21 and are supported upon the frame bar 14 and an extension 22 thereof by the connecting pins 23 as shown in Figs. 5 and 6. The lamp box 15 is supported between the sign boards or plates 18 by means of the braces 24 extending upon opposite sides of the plates into engagement with the box upon the exterior wall thereof. The ends of the lamp box are closed by means of the transparent plates 25 as shown in Fig. 9. The operating mechanism for moving the highway signal is preferably inclosed in a box or casing 26 and comprises an electric motor 27 upon the shaft 28 of which is mounted a pinion 29 meshing with the teeth of a segmental gear plate 30 rigidly mounted upon a shaft 31. The shaft 31 is provided with a pinion 32 the teeth of which engage a vertically positioned track bar 33 which is held in engagement with the pinion by a roller 34 on a shaft 35. The upper end of the rack bar is pivotally connected at 36 with the frame bar 14 as shown in Fig. 5. Movement of the rack bar downwardly by the operation of the motor will move the highway signal to substantially its lowermost position as shown in Fig. 5, the signal being returned to normal or clear position by the action of the weight 14ª when the gear plate 30 is released from the locked position shown in Fig. 5 in a manner which will presently be described. The operating mechanism for the train signal 4 is the same as that for the highway signal 3 and detail description of the parts will, therefore, not be necessary. In this instance the rack bar 33 is pivotally connected at 37 to the arm 38 which is pivoted at 39 to the upright 40. The arm 38 carries a paddle 41 which is of sufficient weight to normally balance the spectacles 42 and hold the signal in danger position when not operated to the position shown in Fig. 3 by the motor 43 inclosed within the casing 44.

Loosely mounted upon the shaft 31 is a segment 45 normally held in the position shown in Fig. 8 by a spring 45ª, the segment being held against downward movement by a stop pin 46. The segment 45 is provided with a contact plate 47 carrying the insulating blocks 48 and 49. Contact fingers 50, 51 and 52 are carried by an insulating block 53, the fingers 50 and 52 being adapted to normally engage the plate 47 as shown in Fig. 8, while the finger 51 engages the insulating block 48. The gear plate 30 is provided with a pin 54, the normal position of which is indicated by the dotted circle in Figure 5. Upon operation of the motor the gear plate 30 is rotated and the pin 54 moved into engagement with the segment 45 to lift the segment to the position indicated in Fig. 7, at which time the finger 51 will begin to engage the contact plate 47. When this is done the magnet 55 will be cut into a circuit established through contact finger 51 in a manner hereinafter described. The motor 27 is operated when the track switch 6 is closed by an approaching train in a manner which will be hereinafter described. As the gear plate 30 and pinion 32 are rotated the rack bar 33 is moved downwardly to move the signal 3 to substantially the position shown in Fig. 5. The gear plate 30 is provided with a notch 59 and opposite the notch a beveled face 60 is formed upon the segment 45. An armature 61 is pivoted at 62 and is normally held in the position shown in Fig. 8 by a spring 63. The armature is provided with a downward projection 64 and when said armature is pulled up by the magnet 55 the projection 64 rides upon the beveled edge 60 of the segment 45 until the segment is moved to the position shown in Fig. 5. In moving the segment to this position the motor 27 is automatically cut out as the finger 52 passes from the switch plate 47 to the insulating block 49, the gear plate 30 being locked at this time by the projection 64 entering the notch 59 as shown. Positioned upon the frame bars 13 and 14 are insulating blocks 65 supported by a bar 66 interposed therebetween. Upon one of the insulating blocks are supported the contact fingers 67 and 68 which rest upon the rings 69 and 70 respectively. The rings are mounted upon the shaft 9 and are insulated therefrom by the insulating members 71. A similar insulating member 72 is mounted upon the shaft 9 and carries a ring section 73 which is adapted to be normally engaged by a contact finger 74 on one of the insulating blocks 65 when the highway signal 3 is in clear or normal position as shown in Fig. 11. A similar contacting finger 75 is adapted to engage the ring section 73 when the highway signal is moved to substantially extreme danger position as indicated in Figs. 5 and 10. Within the lamp box 15 I provide preferably upon opposite sides of the clear signal lamps 19, two series of red lamps 77 and 78, the series 77 being connected to the contact fingers 68 and 75 by the conductors 79 and 80 respectively, and the series 78 to the same contact fingers by the conductors 81 and 82 as clearly shown in Fig. 4. The white or clear signal lamps 19 are connected to the contact fingers 67 and 74 by the conductors 83 and 84 respectively.

Figures 3, 4:
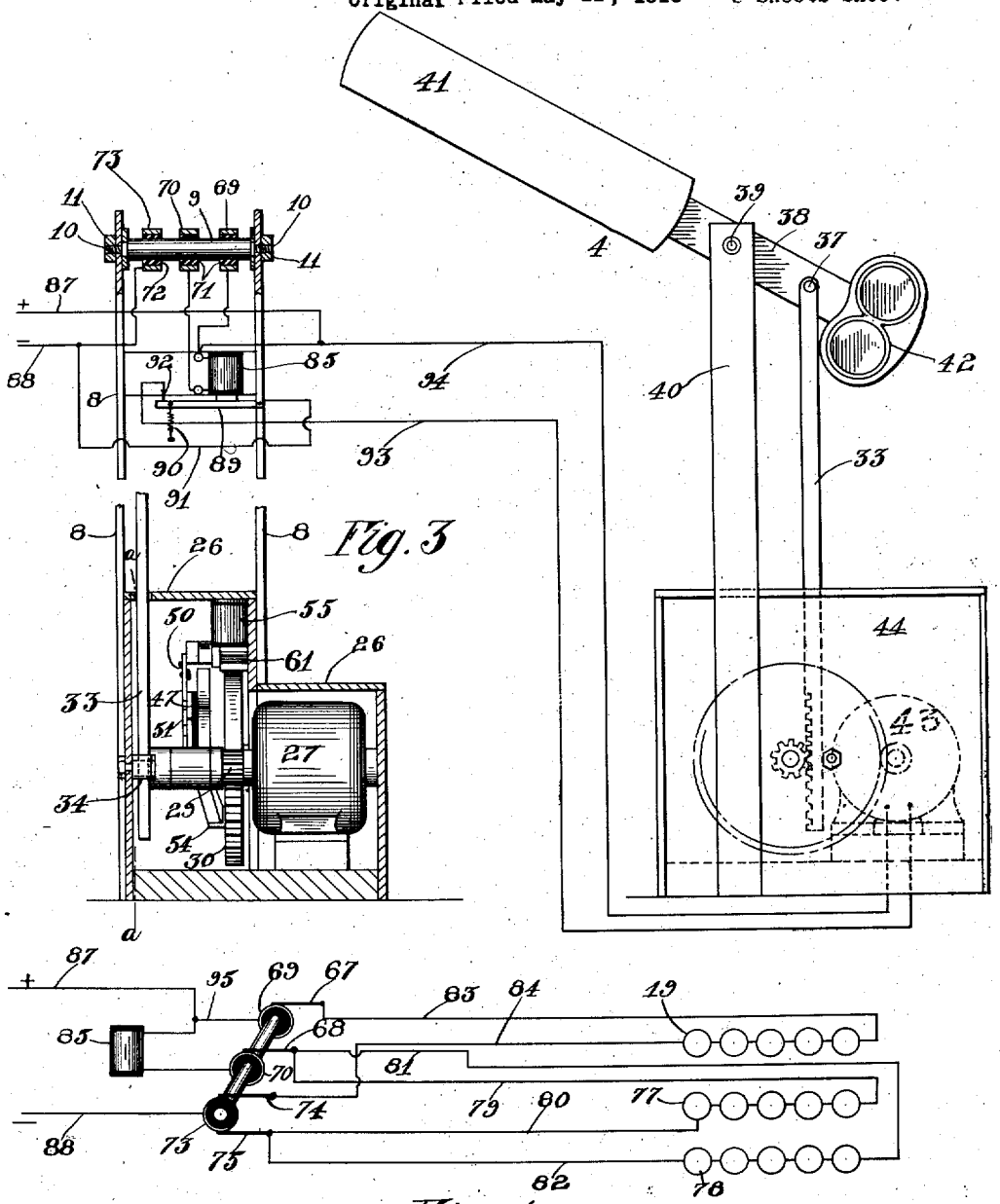
Fig. 3 is a view in elevation showing the connected train and highway signal operating mechanisms; the latter being shown in section.
Figure 4 is a diagrammatic view, illustrating the manner of controlling the circuit for the highway signal lamps.

A magnet 85 is supported by the uprights 8 and is arranged to be energized when the motor 27 pulls the highway signal 3 to danger position. At such time the magnet 85 serves to close the circuit controlling the motor 43 which operates the train signal 4 to release position as shown in Fig. 3. However, this signal is not operated until after the motor 27 on a separate circuit, has been operated by closing the switch 6. One end of the magnet 85 is connected to the contact ring 70 by the conductor 86 and the other end to a conductor 87. With the highway signal operated to danger position as indicated in Figs. 3 and 4, current will flow through conductor 88, contact segment 73, finger 75, conductors 80 and 82, lamps 77 and 78, conductors 79 and 81, contact finger 68, conductor 86, magnet 85, and thence through conductor 87, it being understood that conductors 87 and 88 may be connected with any suitable source of current supply. When magnet 85 is thus energized armature 89 which is normally held down by a spring 90, will be pulled up and the circuit controlling the motor 43 will be closed at which time the train signal 4 will be moved to clear position. When the armature 89 is pulled up current will flow from conductor 88 through conductor 91, armature 89, contact 92, conductor 93, motor 43, conductor 94 and thence through conductor 87. With the highway signal in clear position current for lighting the lamps 19 will flow through conductor 88, ring segment 73, contact finger 74, conductor 84, lamps 19, conductor 83, contact finger 67, ring 69, conductor 95 and thence through conductor 87. The circuit controlling the highway motor 27, as previously stated, comprises a separate circuit from that which is adapted to light the highway signal lamps and operate the train signal motor 43. The mechanism for controlling the circuit for the motor 27 comprises the circuit closing switch 6 and the circuit breaking switch 7 as well as the magnet 96 and armature 97. The closing switch 6 comprises a casing 98 provided with a bottom cover plate 99 upon which rests suitable insulating material 100 for insulating a contact block 102 provided with a groove or slot in which is positioned a slide 103 carrying a contact spring 104 normally resting upon the insulating material 100 as shown in Fig. 2. The slide 103 is connected with a rod 105 slidably mounted upon the casing 98 and extending therethrough and pivotally connected at 106 to one end of an arched resilient member 107. The other end of the arched resilient member is pivotally connected at 108 to a rod 109 slidably mounted upon the casing 98. The resilient member 107 is preferably an arched spring arranged to normally project above the track rail 110 in position to be depressed by the wheel 5 of a train moving upon the track. The circuit breaking switch 7 is similar to the switch 6 except that it normally remains in closed instead of open position. It comprises the casing 111 and the cover plate 112, the latter being arranged to support the insulating blocks 113 and 114 which carry the slotted or grooved guides 115 and 116 respectively. The guide 115 is adapted to receive a contact slide 117 which is arranged to be moved by the slidably mounted rod 118 pivoted at 119 to one end of an arched spring or resilient member 120. The other end of the resilient member is pivoted at 121 to a slidably mounted rod 122 which carries a slide 123 movable upon the guide 116. The slide 123 is provided with a contact spring 124 which normally engages the slide 117 which is movable upon depression of the spring 120 by the wheel of a train going in one direction while the slide 123 is movable upon depression of the spring by a train going in an opposite direction. Movement of the parts in either case will cause the contact spring 124 to ride upon an insulating block 125 carried by the slide 117 at which time the circuit for energizing the magnet 96 will be broken.

It will be understood that as the train passes over the resilient member 107 and moves the spring 104 to engage the contact 101 that current will flow through conductor 131, magnet 96, conductor 127, circuit closing mechanism 6, conductors 128 and 129, circuit breaking mechanism 7, conductor 130, contact finger 50, switch plate 47, contact finger 52, conductor 56, motor 27 and thence through conductor 126, the conductors 126 and 131 being adapted to be connected with any suitable source for supplying current. This exact circuit is, however, only temporary and is maintained only while the train wheel 5 is traversing member 107 to hold track switch 6 closed. Its function is to close a shorter and more lasting circuit through the motor 27 which circuit is independent of track switch 6 (though including normally closed track switch 7) and which shorter circuit is later broken as a result of a completion of the operation of the motor itself through the actuation of switch plate 45 in the manner earlier described. To wit: When the magnet 96 is energized the armature 97, which is normally held down by the spring 132, is pulled up and as the wheel 5 passes over the resilient member 107 and the latter returns to normal position the circuit through the closing mechanism through track switch 6 will be broken. At the same time current will flow through conductor 131, magnet 96, conductor 133, armature 97, conductors 134 and 129, circuit breaking mechanism 7, conductor 130, contact finger 50, switch plate 47, contact finger 52, conductor 56, motor 27 and conductor 126. However, when the motor has cut itself out by moving segment 47 off of contact finger 52 and onto contact 51 and the current is diverted instead through a circuit including conductors 126 and 58, magnet 55, conductor 57, contact finger 51, segment 47, contact finger 50, conductor 130, track switch 7, conductors 129 and 134, armature 97, conductor 133, magnet 96, conductor 131 to battery, the only remaining function that is being performed is to maintain magnet 55 energized and thus hold the highway signal locked at danger through the continued engagement of armature 61 with gear plate 30 the train passes over the circuit breaking mechanism 7 at the highway crossing and the circuit just described will be broken and consequently the magnet 55 deenergized, at which time the armature 61 is released and the weight 14ª then returns the signal 3 to normal position, the signal 4 being also returned to normal position at the same time.

Although I have shown the train signal 4 as comprising a paddle 41 and spectacles 42 it will be understood that any other suitable type of signal may be substituted and automatically controlled by the operation of the highway signal. The circuit closing mechanism 6 it will be observed is so arranged that the same will be operated by a train passing in one direction only, while the circuit breaking mechanism 7 will be operated by a train passing in either direction.

I claim as my invention:

1. In an electric signaling system for railway crossings, a train signal, a crossing signal, electrically controlled mechanism for moving the crossing signal from clear to danger position arranged to be controlled by a train approaching the crossing, means for characteristically illuminating the crossing signal for danger when moved to danger position and means connected with the illuminating means for operating the train signal, the operation of said last mentioned means being dependent upon the illumination of the crossing signal.

2. In an electric signaling system for railway crossings, a train signal, a crossing signal, means for moving the crossing signal from clear to danger position arranged to be controlled by a train approaching the crossing, means for characteristically illuminating the crossing signal for danger when moved to danger position, means connected with the illuminating means for operating the train signal, the operation of said last mentioned means being dependent upon the characteristic illumination of the crossing signal, and means for releasing said signals adapted to be controlled by the train passing the crossing.

3. In an electric signaling system for railway crossings, a train signal, a crossing signal, means for imparting movement to the crossing signal arranged to be controlled by a train approaching the crossing, means for characteristically illuminating the crossing signal for danger when moved, and means connected with the illuminating means for operating the train signal, the operation of said last mentioned means being dependent upon the characteristic illumination of the crossing signal.

4. In an electric signaling sysem for railway crossings, a train signal, a crossing signal, means for causing the characteristic illumination of the crossing signal for danger arranged to be controlled by a train approaching the crossing, and means connected with the illuminating means for operating the train signal, the operation of said last mentioned means being dependent upon the illumination of the crossing signal.

5. In an electric signaling system for railway crossings, a train signal, a crossing signal, electrically controlled operating mechanism for the crossing signal, an electric circuit for effecting operation of the crossing signal mechanism controlled by a train approaching the crossing, a normally open electric circuit provided with a magnet and adapted to be closed to effect a characteristic danger illumination of the crossing signal when the latter is operated by said mechanism and a normally open electric circuit for controlling the operation of the train signal arranged to be closed by the magnet in the last mentioned circuit.

6. In an electric signaling system for railway crossings, a train signal, a crossing signal arranged to be controlled by a train approaching the crossing, a normally open electric circuit including lamps for effecting a characteristic illumination of the crossing signal to indicate danger arranged to be closed upon operation of the crossing signal mechanism and means connected with said circuit when closed for operating the train signal, the operation of said means being dependent upon the illumination of the lamps.

7. In an electric signaling system, for railway crossings, a train signal, a movable crossing signal, electrically controlled operating mechanism for said crossing signal arranged to be controlled by a train approaching the crossing, electrically controlled operating mechanism for the train signal, a normally open electric circuit containing lamps for illuminating said crossing signal to indicate danger and adapted to be closed upon movement of the latter, a magnet in said circuit, a normally open electric circuit for controlling the train signal operating mechanism arranged to be closed by said magnet, means for locking each of said signal operating mechanisms upon operation of the same, means controlled by a train passing the crossing to effect the opening of said circuits and the consequent release of said locking mechanisms and independent means for returning each of said signals to normal position.

8. In a highway signal for railroad crossings, the combination with a highway signal arm normally at clear, a train signal normally at danger and means including an electric circuit for actuating the train signal to clear, of means for operating the highway signal to danger position embodying a motor, a normally open train operated switch in the motor circuit, a normally closed train operated switch in the same circuit, a lock for holding the highway signal in danger position, means including an electric circuit common to the normally closed train operated switch for operating said lock, means mechanically operated by the motor for breaking the motor circuit and closing that of the lock operating means, a danger light associated with the highway signal and having a circuit controlling the train signal circuit, and a switch in said danger light circuit closed by the movement of the highway signal to danger position.

9. In a highway signal for railroad crossings, the combination with a highway signal arm normally at clear, of means for operating the highway signal to danger position embodying a motor, a normally open train operated switch in the motor circuit, a normally closed train operated switch in the same circuit, a lock for holding the highway signal in danger position, means including an electric circuit common to the normally closed train operated switch for operating said lock, means mechanically operated by the motor for breaking the motor circuit and closing that of the lock operating circuit.

10. In a highway signal for railroad crossings, the combination with a signal arm normally at clear, of means for operating said signal to danger position embodying a motor, a switch including a switch plate and a motor driven member for operating said plate in one direction, an electrically controlled lock for said member, train operated means for energizing the motor to both operate the signal and close the circuit through the switch plate to the lock, said lock being adapted to in turn actuate the switch plate to break the circuit through the motor, and a second train operated means for breaking the circuit through the lock to allow the signal and its operating means to return to normal position.

11. In a highway signal for railroad crossings, the combination with a signalling member normally at clear and embodying a danger light having a circuit closed by the movement of the signalling member to danger position, of a train controlled means for operating the signalling member to danger position, a train signal normally at danger and electrical means controlled by the danger light for operating the train signal to clear.

12. The combination with a highway danger light, of train controlled means for closing a circuit through said light, a train signal normally at danger and electrical means controlled by the highway danger light for clearing said train signal.

13. In a highway signal for railroad crossings, the combination with a highway signaling danger light and means including a normally open circuit for illuminating the same, of a train-controlled means for closing said circuit, a distant train signal normally at danger, and electrical means controlled by the circuit of the danger light for operating the train signal to clear.

DEWEY M. KENNEDY.